United States Patent
Murphy et al.

(10) Patent No.: US 6,312,056 B1
(45) Date of Patent: Nov. 6, 2001

(54) OCCUPANT RESTRAINT SYSTEM WITH COMPARTMENTALIZATION

(76) Inventors: Gary H. Murphy, 1016 Belmont St., Watertown, MA (US) 02172; George E. Temple, IV, 1648 Marsh Harbor La., Mount Pleasant, SC (US) 29464-4569; Keith A. Gudeman, 15667 Gary La., Livonia, MI (US) 48154

( * ) Notice: Subject to any disclaimer, the term of this patent is extended or adjusted under 35 U.S.C. 154(b) by 0 days.

(21) Appl. No.: 09/224,159

(22) Filed: Dec. 31, 1998

Related U.S. Application Data

(60) Provisional application No. 60/089,613, filed on Jun. 16, 1998.

(51) Int. Cl.[7] .................................................. B60R 21/00
(52) U.S. Cl. ...................... 297/464; 297/473; 297/474; 297/475; 297/483; 297/216.1; 297/216.13; 297/452.2
(58) Field of Search ............................ 297/233, 216.1, 297/216.13, 216.14, 248, 452.2

(56) References Cited

U.S. PATENT DOCUMENTS

| | | | |
|---|---|---|---|
| 2,488,858 | * 11/1949 | Franz | 297/475 |
| 3,169,036 | * 2/1965 | Spooner | 297/473 X |
| 3,385,633 | * 5/1968 | Aizley | 297/473 |
| 3,620,569 | 11/1971 | Mathis . | |
| 4,005,765 | * 2/1977 | Reilly | 297/216.1 X |
| 4,114,947 | 9/1978 | Nelson . | |
| 4,681,344 | 7/1987 | Majerus . | |
| 4,973,083 | 11/1990 | Richards et al. . | |
| 5,088,794 | * 2/1992 | Iwami et al. | 297/483 |
| 5,176,402 | * 1/1993 | Coulon | 297/474 X |
| 5,536,066 | 7/1996 | Sedlack . | |
| 5,564,785 | * 10/1996 | Schultz et al. | 297/473 X |
| 5,575,533 | * 11/1996 | Glance | 297/452.2 |
| 5,624,135 | 4/1997 | Symonds . | |
| 5,626,359 | * 5/1997 | Steffens, Jr. et al. | 280/735 |
| 5,636,901 | * 6/1997 | Grilliot et al. | 297/216.1 X |
| 5,676,421 | * 10/1997 | Brodsky | 297/216.13 |

FOREIGN PATENT DOCUMENTS

094026553 * 11/1994 (WO) .................................. 297/248

* cited by examiner

Primary Examiner—Peter M. Cuomo
Assistant Examiner—Rodney B. White
(74) Attorney, Agent, or Firm—O'Connell Law Firm

(57) ABSTRACT

An occupant restraint system for restraining an occupant in a seating arrangement comprising a vehicle seat wherein the vehicle seat has a seat frame, a seat bottom coupled to the frame, and a seat back coupled to the seat frame wherein the seat back has a first edge and a second edge, the occupant restraint system comprising a first anchoring assembly for being attached to the vehicle seat adjacent to the first edge of the seat back, a second anchoring assembly for being attached to the vehicle seat adjacent to the second edge of the seat back, a first elongate flexible member with a body portion extendibly and retractably retained on the first anchoring assembly, a mechanism for coupling a portion of the first elongate flexible member to the second anchoring assembly whereby the body portion of the first elongate flexible member traverses the seat back from the first edge to the second edge, a first buckle element coupled to the body portion of the first elongate flexible member, a first corresponding buckle element for buckling to the first buckle element and for being coupled to the vehicle seat whereby, when the first anchoring assembly, the second anchoring assembly, and the second buckle element are coupled to the vehicle seat, an occupant can be restrained by the first elongate flexible member at three restraining points with a first restraining point comprising the first anchoring assembly, a second restraining point comprising the second anchoring assembly, and a third restraining point comprising the coupling of the first buckle element to the first mating buckle element.

5 Claims, 6 Drawing Sheets

OCCUPANT RESTRAINT SYSTEM WITH COMPARTMENTALIZATION

This appln claims benefit of Prov. No. 60/089,613 filed Jun. 16, 1998.

FIELD OF THE INVENTION

The present invention relates generally to occupant restraint systems for motor vehicles. More particularly, the invention disclosed herein relates to an occupant restraint system for use relative to seats such as those commonly employed in school buses.

BACKGROUND OF THE INVENTION

For many years, automobiles have been provided with occupant restraint devices for protecting vehicle passengers from injury due to sudden changes in vehicular velocity as would result from an impact or sudden braking. Lap belts in automobiles have been supplanted by three point occupant restraint systems intended to add still greater injury protection. Even greater safety has been realized by the additional provision of cushioning air bags that explode into a nearly enveloping protective position in the event of an automobile collision.

Most notably, however, large transportation vehicles have historically been left completely without occupant restraint mechanisms. For example, seat belts traditionally have been foregone in school buses because the safety mechanisms were considered unduly expensive and unnecessary in light of the general infrequency of accidents and the typically minor injuries resulting therefrom. Also, later model buses provide alternative safety mechanisms designed to absorb passenger impact in the event of an accident or the like.

Termed compartmentalization, this method contemplates having the school bus occupant thrown into the seat forward of the occupant's seat. Each of the seats on such school buses are designed to absorb and dissipate the kinetic energy of the thrown rider. To do so, compartmentalization-type seats are padded sufficiently to absorb energy from the thrown occupant's head, torso, and knees such that energy is distributed over these three typical impact points. Furthermore, the seats are manufactured to particular dimensional specifications and are set at particular distances. Fortunately, compartmentalization has been found to improve overall occupant safety, which has led to a reduction in serious injuries.

Unfortunately, compartmentalized buses continue to leave their completely unrestrained occupants vulnerable in a number of ways. For example, in a side impact, occupants often are hurled into bus windows or walls or into the edge of an adjacent seat. Most tragically, unrestrained occupants have been ejected from within buses only to find themselves thrown into the path of oncoming traffic, placed at risk of having the vehicle roll over and crush them, or placed in similar life threatening situations. Further still, impacts while an individual is in a bent-over position can lead to a head-first impact with a seat back, which could result in spinal and head injuries.

Advantageously, occupant restraint systems in the form of two-point restraints, or lap belts, have been provided, and these systems serve to prevent an occupant from being ejected from the bus seat by securing the occupant's lower body to the seat bottom. Disadvantageously, lap belts fail to restrain the occupant's upper torso and head such that these body parts will tend to experience a potentially violent, whipping movement in an impact situation. This movement can lead to head, neck, and spine injury as the occupant may be simply thrashed about or snapped into the forward bus seat or the wall of the bus.

In light of the above, it becomes clear that providing an effective occupant restraint system that restrains both the upper and lower portions of an occupant's torso against both forward and lateral movement would greatly increase the safety of school bus occupants. The unfortunate reality, however, is that there are so many buses in service today that retrofitting them all with a truly effective occupant restraint system that resists tampering and inadvertent disablement would be unrealistic unless the occupant restraint mechanism were capable of being attached to a bus seat in a time and cost-effective manner.

SUMMARY OF THE INVENTION

Advantageously, the present invention sets about with the broadly-stated goal of providing an occupant restraint mechanism for buses and similar vehicles that meets each of the needs left by the prior art while providing a number of heretofore unrealized advantages.

Stated more particularly, a principal object of the present invention is to provide an occupant restraint system that allows a school bus seat to be retrofitted or provided originally with an occupant restraint system that greatly increases the safety of school bus occupants.

A related object of the invention is to provide an occupant restraint system that not only restrains an occupant against leaving the vehicle seat as a result of an impact but that also restrains the occupant's upper torso against undesirable movement during an impact thereby preventing injury to an occupant's head, torso, knees, and body in general.

Yet another object of the invention is to provide such an occupant restraint system that resists tampering and inadvertent disablement.

Still another object of the invention is to provide an occupant restraint system that improves passenger organization and control by inducing occupants to remain seated and apprising an operator as to whether all occupants are properly restrained.

An additional object of the invention is to provide such an occupant restraint system that is adjustable to accommodate occupants of a wide variety of sizes.

A further object of the invention is to provide such an occupant restraint system that can be mounted to an existing standard school bus seat in a time and cost-effective manner such that it would be practicable to apply occupant restraint mechanisms to a vast multitude of school buses.

These and still further objects and advantages of the present invention will be readily obvious both to one who reviews this disclosure and to one who has an opportunity to make use of an embodiment of the instant invention for an occupant restraint system.

Of course, one should remain mindful that the present discussion is designed merely to outline broadly the more important features and advantages of the invention to enable a better understanding of the detailed description that follows and to instill a better appreciation of the inventors' contribution to the art. Before an embodiment of the invention is explained in detail, it must be made clear that the following details of construction, descriptions of geometry, and illustrations of inventive concepts are mere examples of possible manifestations of the invention. It should also be made clear that, although the invention is described in relation to a school bus seat, the occupant restraint system is readily applicable to a wide variety of vehicles such as trains and autos.

DETAILED DESCRIPTION OF A PREFERRED EMBODIMENT

Figure 1:
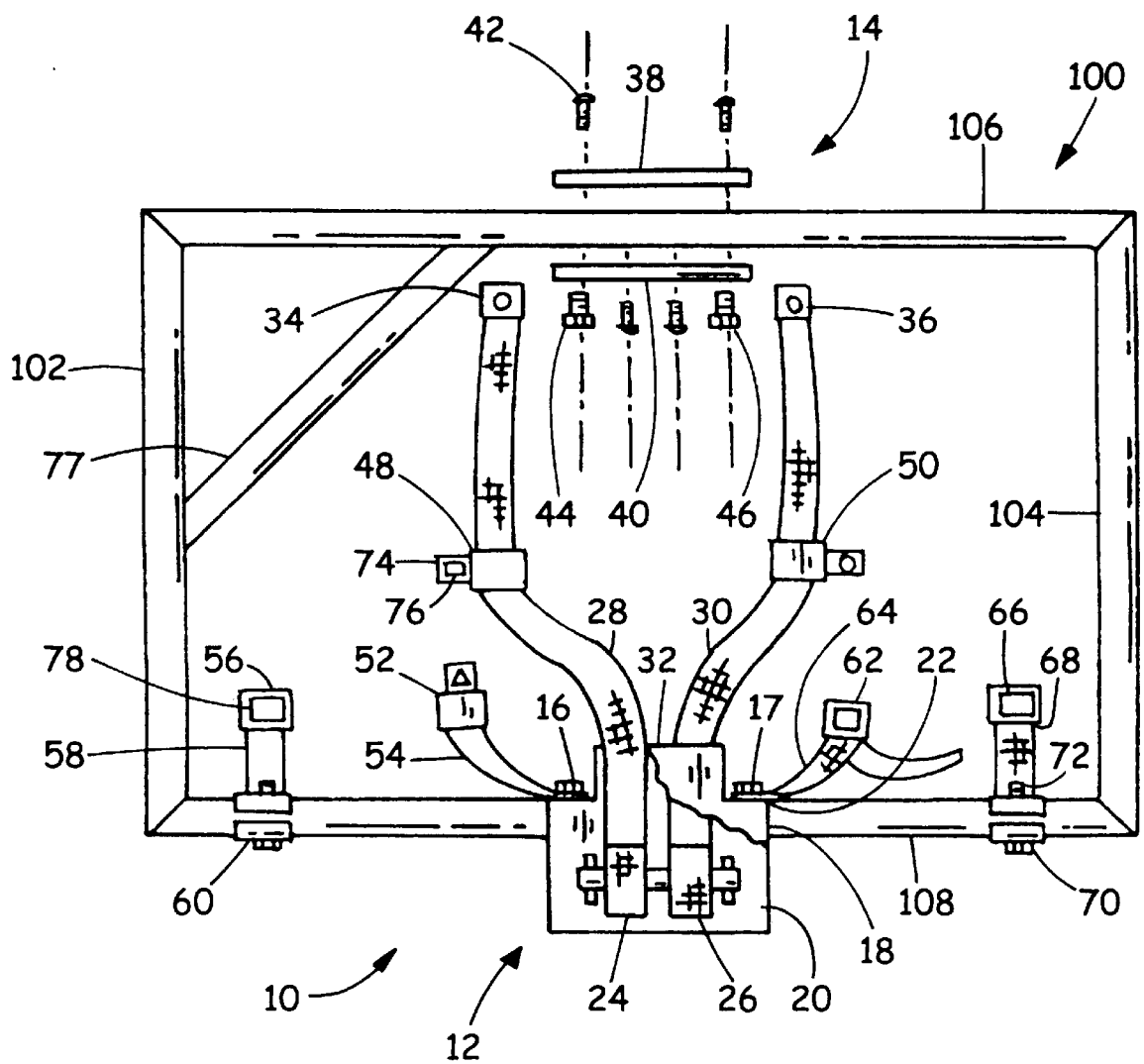
FIG. 1 is a view in front elevation of an occupant restraint system according to the present invention shown mounted on a seat back frame.

Looking more particularly to the figures, an embodiment of the present invention for an occupant restraint system is indicated generally at 10 in FIG. 1, where the occupant restraint system 10 is shown for clarity mounted only to a seat back frame 100. Although the occupant restraint system 10 is discussed primarily relative to a single bench-type seat 150 of the type found in school buses, it is imperative to note that the invention could be applied to a wide variety of seat types, vehicle types, and seating arrangements. Typically, the seat back frame 100 is substantially encased in protective padding, which is enveloped in a seat cover of vinyl or the like. In any event, one will see that the seat back frame 100 comprises a first upright member 102, a second upright member 104, an upper member 106, and a lower member 108. These members are shown in FIG. 1 to comprise cylindrical sections. However, one skilled in the art will be aware that square and other cross sections are also employed.

The occupant restraint system 10 is founded on a lower anchoring assembly 12 that comprises an enveloping housing 18 with a rigid base plate 20 and a curved edge 22 that overlies the lower member 108 of the seat back frame 100. Of course, where the lower member 108 is not cylindrical, the shape of the edge 22 will be adapted to engage that other shape. The lower anchoring assembly 12 is fixed to the lower member 108 by any appropriate fastening means such as welding, clamping, or bolting with a first anchoring bolt 16 and a second anchoring bolt 17 that bolt directly into the lower member 108. Although the enveloping housing 18 is shown partially sectioned away to allow one to view the inner workings of the lower anchoring assembly 12, it is preferred that the enveloping housing 18 completely shroud the lower anchoring assembly 12 to prevent tampering and injury and to protect the mechanical elements that are retained within the enveloping housing.

Fixed to the base plate 20 of the housing 18 is a first seat belt spool 24 and a second seat belt spool 26, with each being completely independently operable relative to the other. The first and second seat belt spools 24 and 26 are of the standard spring-loaded type well known to the art wherein an elongate fabric strip of strong and durable fabric is retained on a spool that is spring biased to tend to reel the elongate strip onto the spool. The elongate strip can be extended freely against the biasing action of the spool provided this is done at less than a predetermined velocity. Where that predetermined velocity is exceeded as might happen in an impact situation or the like, a locking mechanism (i.e., a ratchet and pawl) is activated to lock the spool against further unrolling. Accordingly, one will see that the first seat belt spool 24 retains a first elongate fabric strip 28, and the second seat belt spool 26 retains a second elongate fabric strip 30.

Figure 2:
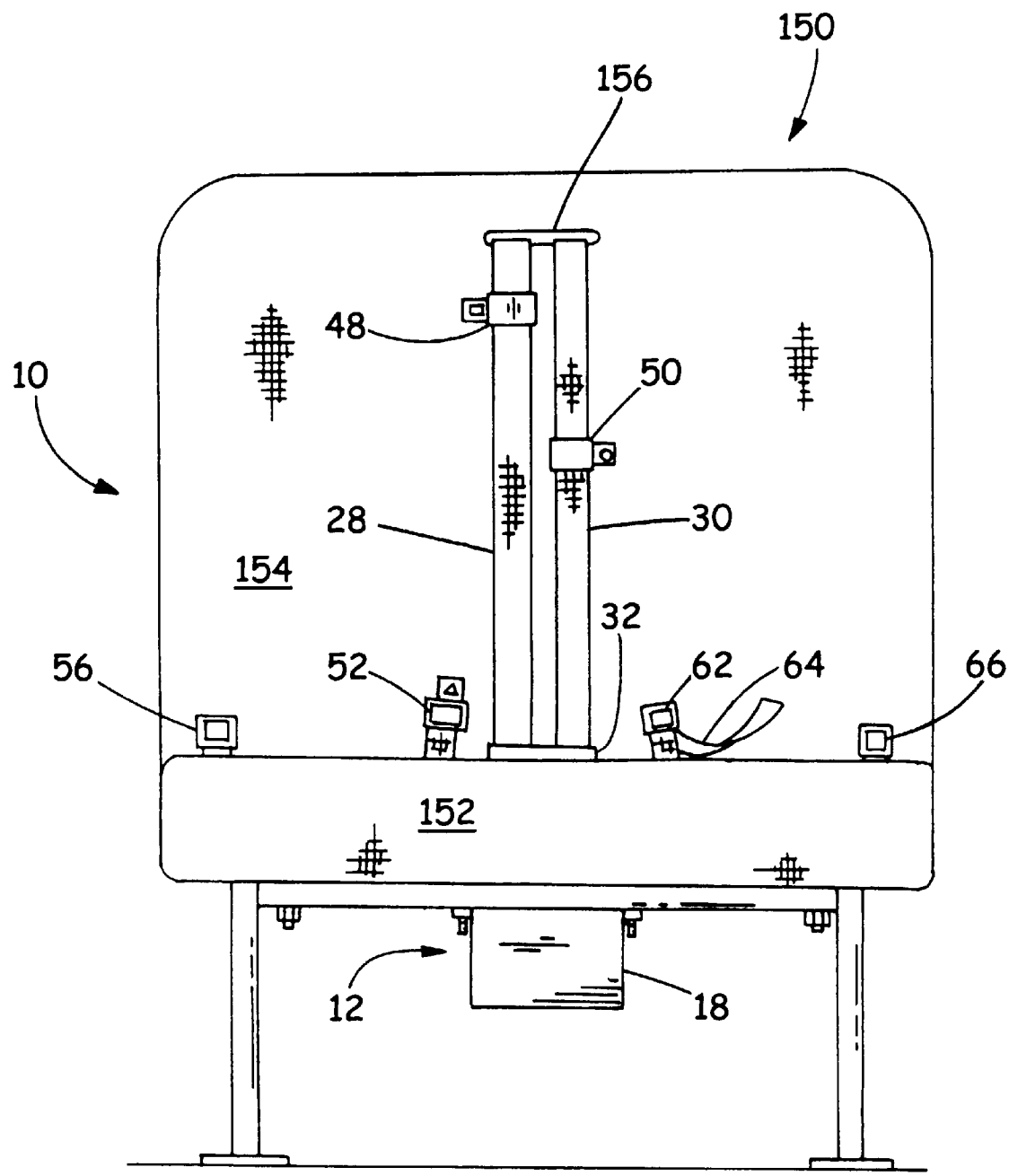
FIG. 2 is a view in front elevation of the occupant restraint system of FIG. 1 shown mounted on a fully assembled bus seat.

The first and second elongate fabric strips 28 and 30 exit the enveloping housing 18 through a wide but thin guide tunnel 32 that comprises a projection from the enveloping housing 18. The first elongate fabric strip 28 ends in a distal end 34, and the second elongate fabric strip 30 ends in a distal end 36. When an entire bus seat 150 is assembled, as is shown in FIG. 2, the guide tunnel 32, and thus the first and second elongate fabric strips 28 and 30, extends between the seat bottom 152 and the seat back 154. The distal end of the guide tunnel 32 projects slightly above the seat bottom 152. With this, the guide tunnel 32 maintains the first and second elongate fabric strips 28 and 30 in a proper disposition and prevents them from tangling.

Looking again to FIG. 1, one sees that coupled to the upper member 106 of the seat back frame 100 is an upper anchoring assembly 14. Although FIG. 1 shows the upper anchoring assembly 14 in an exploded view, in practice the upper anchoring assembly anchors the distal ends 34 and 36 of the first and second elongate fabric strips 28 and 30 to the upper member 106 of the seat back frame 100. To do so, the upper anchoring assembly 14 comprises a first semi-cylindrical member 38 and a second semi-cylindrical member 40 that together sandwich the upper member 106 and are bolted thereto by bolts 42. In turn, the distal ends 34 and 36 of the first and second elongate fabric strips 28 and 30, respectively, are fixed to the upper anchoring assembly 14, and thus the upper member 106 by a first distal end fastening bolt 44 and second distal end fastening bolt 46, respectively.

Slidably retained on the first elongate fabric strip 28 is a first male buckle element 48. Similarly, a second male buckle element 50 is slidably retained on the second elongate fabric strip 30. Still further, a third male buckle element 52 is fixedly retained at a distal end of a third elongate fabric strip 54 that is shown to be non-extendibly anchored to the lower anchoring assembly 12 by the first anchoring bolt 16. Of course, it is well within the scope of the present invention to provide a third elongate fabric strip 54 this is extendibly and retractably retained by a seat belt spool (not shown). A first female buckle element 56, which may be termed equally aptly a first corresponding buckle element 56, is fixedly retained at a distal end of a fourth elongate fabric strip 58 that is non-extendibly anchored to the lower member 108 by a fastening assembly 60. A second female buckle element 66 is fixedly retained at a distal end of a fifth elongate fabric strip 68 that is non-extendibly anchored to the lower member 108 by a fastening assembly 70. Finally, a third female buckle element 62 is adjustably retained along a sixth elongate fabric strip 64 that is non-extendably anchored to the lower anchoring assembly 12 by the second anchoring bolt 17.

With particular reference to the first female buckle element, one will note that each of the female buckle elements 56, 66, and 62 has an enlarged release button 78 for releasing the female buckle element 56, 66, or 62 from its respective male buckle element 48, 50, and 52. Like the guide tunnel 32, the first female buckle element 56 and the second female buckle element 66 project slightly above the seat bottom 152. The fourth and fifth elongate fabric strips 58 and 68 may be enclosed in a flexible plastic sheath 72 as is the fifth elongate fabric strip 68 so that they tend to maintain a desired position, or they may be non-sheathed as is the fourth elongate fabric strip 58.

With particular reference to the first male buckle element 48, the astute observer will realize that each of the first, second, and third male buckle elements 48, 50, and 52 has a male projection 74 extending therefrom. One will further notice that each male projection 74 has a cutout 76 therein for receiving a corresponding spring-biased locking element (not shown) within its respective female buckle element 56, 66, or 62, respectively. Most advantageously, the cutout 76 of each buckle element 48, 50, and 52 is unique relative to the other buckle elements 48, 50, and 52. As a result, the first male buckle element 48 will engage only the first female buckle element 56, the second male buckle element 50 will engage only the second female buckle element 66, and the third male buckle element 52 will engage only the third female buckle element 62. With this, confusion regarding which buckle assembly belongs to which occupant is eliminated, and added safety is gained by ensuring that each occupant will have an available buckle assembly.

A fully assembled bus seat 150 with the occupant restraint system 10 fixed thereto and prepared for use is shown in FIG. 2. One will note that when the bus seat 150 is assembled in this embodiment, the first and second elongate fabric strips 28 and 30 pass through a slot 156 is the seat back 154 to attach to the upper anchoring assembly 14.

Under this arrangement, three occupants can be restrained on the bus seat 150. The outer two occupants, who arguably need protection against lateral and similar movement most, enjoy a three point restraint. A first occupant can be restrained adjacent a first end of the bus seat 150 by sliding the first male buckle element 48 along the first elongate fabric strip 28 to an appropriate height based on the height and girth of the occupant, drawing the first male buckle element 48 toward the first female buckle element 56 by pulling a sufficient length of the first elongate fabric strip 28 from within the enveloping housing 18, adjusting the position of the first male buckling element 48 along the first elongate fabric strip 28 as is necessary, and inserting the male projection 74 of the first male buckling element 48 into the first female buckling element 56. A second occupant can be retained adjacent to a second end of the bus seat 150 by similarly operating the second elongate fabric strip 28, the second male buckling element 50, and the second female buckling element 66. Finally, a third occupant can be restrained in a middle of the bus seat 150 by an occupant's adjusting the position of the third female buckling element 62 along the sixth elongate fabric strip 64 to suit the occupant's size and then inserting the male projection 74 of the third male buckling element 52 into the third female buckling element 62.

In a manner known to those skilled in the art, the occupant restraint system 10 could further include a sensor for detecting whether the first, second, and third male and female buckling elements 48, 50, and 52 and 56, 66, and 62, respectively are coupled together. There could further be included a sensor for detecting whether a given seat is occupied, which could be caused to trigger the sensor for detecting whether the first, second, and third male and female buckling elements 48, 50, and 52 and 56, 66, and 62, respectively, are coupled together. The sensor for detecting whether a given seat is occupied could comprise a means for detecting weight applied to the seat bottom 152 (see FIG. 2), which would indicate occupancy, or a means for detecting a rise in seat temperature, which would also indicate occupancy. Still further, there could be a means for alerting an operator (i.e., a bus driver) as to whether all occupied seats are appropriately buckled. Each of these sensors and means are well known to those skilled in the art.

Figure 3:
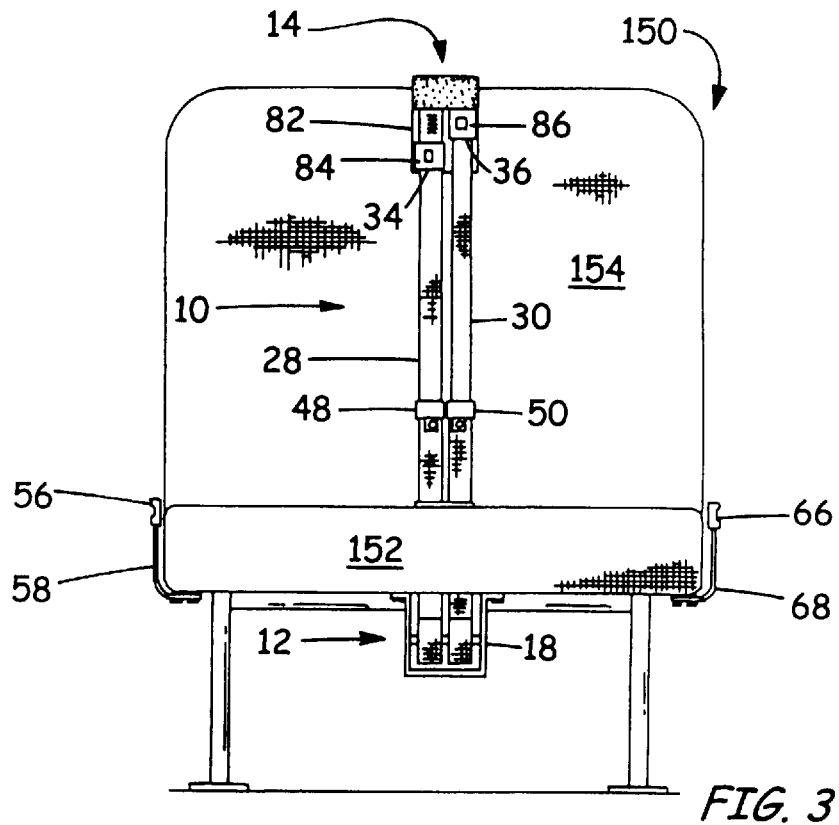
FIG. 3 is a view in front elevation of an alternative embodiment of the present invention for an occupant restraint system.
Figure 4:
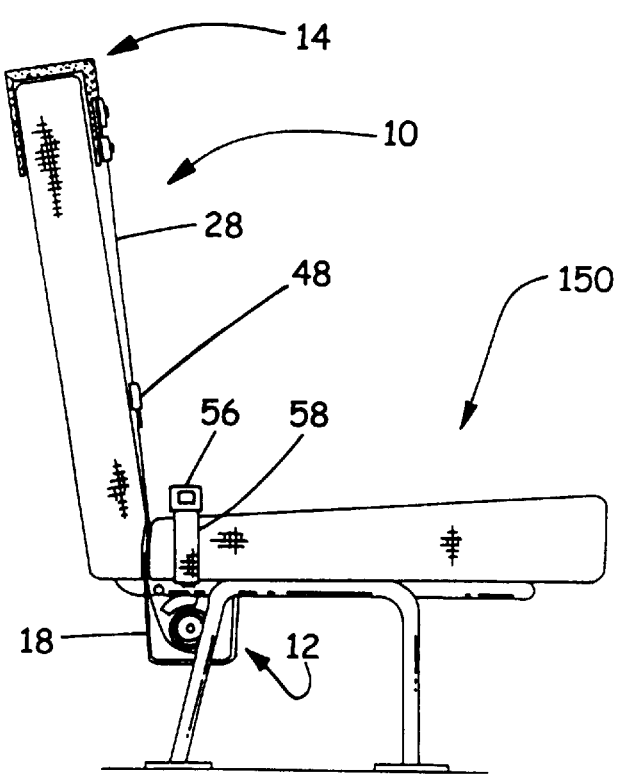
FIG. 4 is a view in side elevation of the occupant restraint system of FIG. 3.

FIGS. 3 and 4 depict an alternative embodiment of the invention wherein the occupant restraint system 10 is adapted for providing three point restraint for two occupants. The occupant restraint system 10 is similar in structure and operation to the first described embodiment but deviates therefrom first in that the first and second female buckling members 56 and 66 are attached outboard of the seat bottom 152 and second regarding the upper anchoring assembly 14. In this embodiment, instead of being embedded within the seat back 154, the upper anchoring assembly 14 is a U-shaped member that sandwiches and frictionally engages the upper portion of the seat back 154 with a first leg of the U extending downwardly along the back of the seat back 154, the base of the U engaging the upper edge of the seat back 154, and a second leg of the U extending downwardly along the front of the seat back 154. To protect occupants in the event of collision with the upper anchoring assembly 14, it is substantially encased in resiliently compressible material such as foam. The distal ends 34 and 36 of the first and second elongate fabric strips 28 and 30 are adjustably coupled to the second leg of the upper anchoring assembly 14, which second leg comprises an adjusting plate 82 by first and second adjustable connectors 84 and 86. In this embodiment, installation is certainly simplified, and operation is different only in that the occupant has the ability of adjusting the height of the upper restraint point by adjusting the height of the first or second adjustable connectors 84 and 86, respectively.

Figure 5:
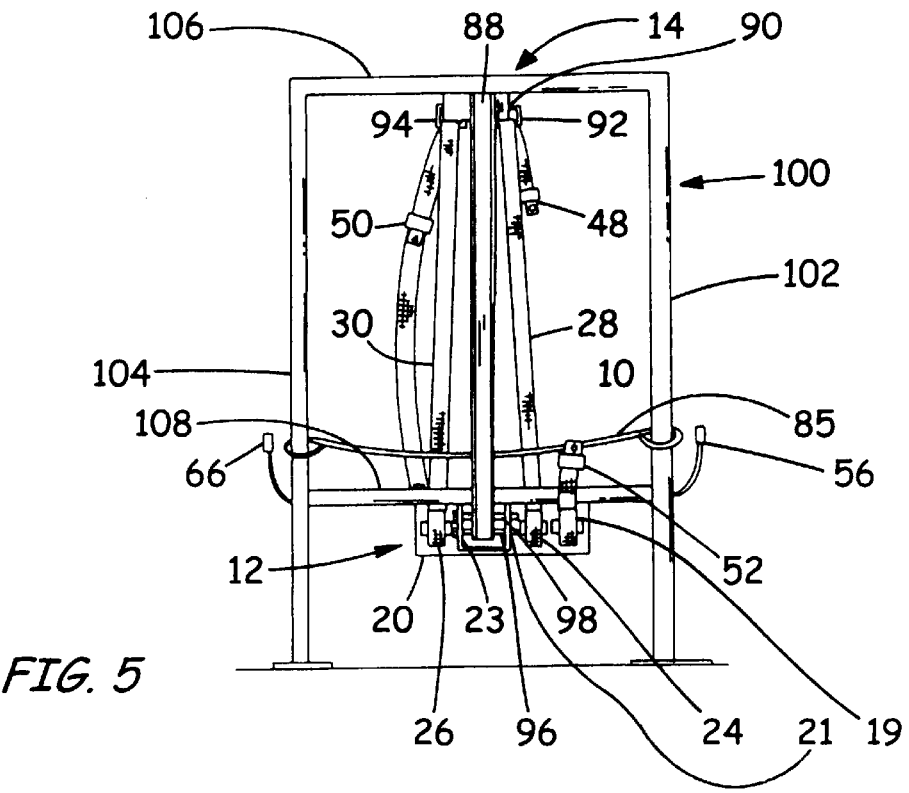
FIG. 5 is a view in rear elevation of still another embodiment of the present invention occupant restraint system.
Figure 6:
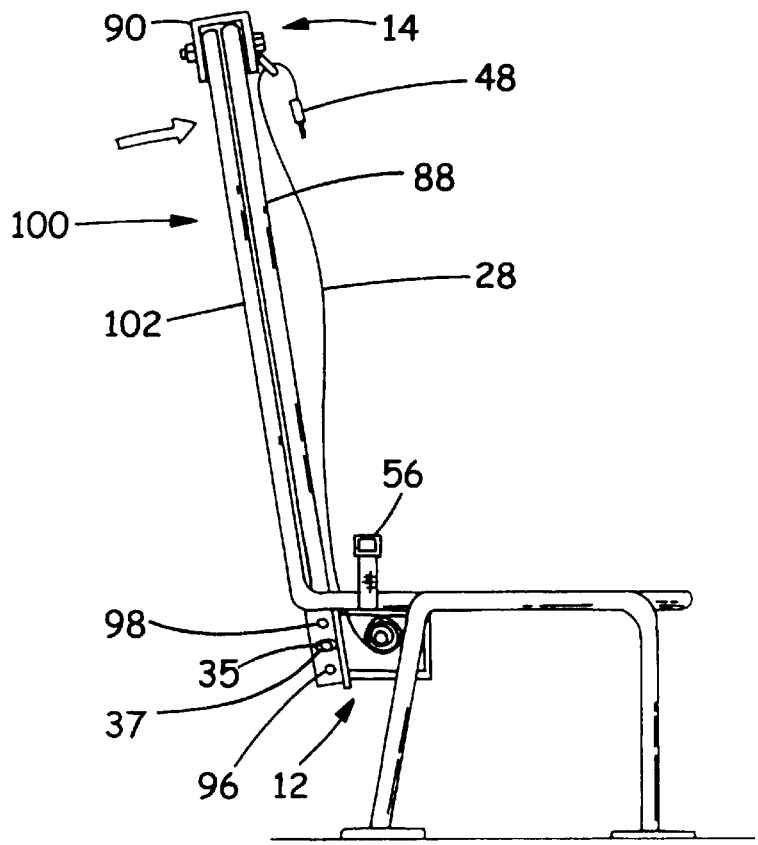
FIG. 6 is a view in side elevation of the occupant restraint system of FIG. 5.

FIGS. 5 and 6 show yet another embodiment of the invention. In this embodiment, the lower anchoring assembly 12 is again fixed to the lower member 108 of the seat back frame 100, and first and second seat belt spools 24 and 26 are rotatably coupled to the lower anchoring assembly 12. In this embodiment, however, the occupant restraint system 10 is reinforced by a spine 88, which comprises an elongate H-channel or C-channel of metal, such as steel. Although the spine 88 is depicted toward a middle portion of the seat, it may be preferable to dispose the spine 88 adjacent to an end of the seat to reduce stress on the upper member 106. Should it be deemed necessary to shore up the upper member 106 or the occupant restraint system 10 in general, one could provide an angularly disposed reinforcement bar 77, which may be welded or bolted in place, as is shown in FIG. 1.

The upper end of the spine 88 is coupled to the upper member 106 by bolting or welding and is further fixed to the upper member 106 by a reinforcing plate 90 that is bolted as is shown in FIG. 6 or welded as is shown in FIG. 5 to both the upper member 106 and the spine 88. The first and second elongate fabric strips 28 and 30 pass through first and second D-rings 92 and 94 that are fixed to the reinforcing plate 90 so that a user can draw the first and second male buckling elements 48 and 50 toward the first and second female buckling elements 56 and 66. The first and second buckling elements 48 and 50 can be fixed to the distal ends of the first and second elongate fabric strips 28 and 30 as is shown relative to the first elongate fabric strips 28 whereby only the upper torso of the occupant will be restrained, or the first and second buckling elements 48 and 50 can be slidably coupled to the first and second elongate fabric strips 28 an 30 with the distal end of the first and second elongate fabric strips 28 and 30 fixed to the lower member 108 as is shown relative to the second elongate fabric strip 30 whereby an occupant will enjoy a three point restraint as would be enabled in the embodiment of FIG. 1.

One will further note that a third seat belt spool 19 is provided with a third male buckle element 52. Advantageously, the third male buckle element 52 is of a type that not only provides a male projection 74, but it also provides a female receptor, which is also indicated at 52. With this, the third male buckle element 52 can be inserted into the second female buckle element 56 to provide a two point restraint, and, if desired, the first male buckle element 48 can be drawn downward and inserted into the third male buckle element 52 to create a still more unique three point restraint.

One skilled in the art will realize that the bottom of the spine 88 must be joined to the lower anchoring assembly 12 in a manner that will allow the spine 88 to move forward with the remainder of the seat back frame 100 in response to the application of a specific force (i.e., 2,400 pounds) in the forward direction indicated by the arrow in FIG. 6 applied to the rear of the seat back frame 100. To accomplish such a coupling, the embodiment of FIGS. 5 and 6 employs a horizontal sheer pin system wherein an upper pin 98 and a lower pin 96 pass through first and second panels 21 and 23 that extend from the base plate 18 of the lower anchoring assembly 12 and through the base of the spine 88, which is disposed between the first and second panels 21 and 23. During normal operation, the upper pin 98, which may be crafted from an aluminum alloy, and the lower pin 96, which may comprise a steel bolt, retain the base of the spine 88 adjacent to the base plate 18. However, when a sufficient forward force is applied to the rear of the seat back frame 100, the upper pin 98 will snap thereby allowing the spine 88 to rotate about the lower pin 96, which acts as a fixed axis bolt 96. An alternative axis bolt 96 could comprise a hinge mechanism (not shown). With this, the spine 88 will give way and move forward along with the remainder of the seat back frame 100. Further preventing the spine 88 from moving forward is a tether 85, which may comprise a steel reinforced cable, that is coupled at a first end to the first upright member 102 and at a second end to the second upright member 104. The body portion of the tether 85 passes in front of the spine 88 but behind the first and second elongate fabric strips 28 and 30.

One will note that the embodiment of FIG. 6 is slightly varied from that of FIG. 5 in that in FIG. 6, a third pin 35, which in this case happens to be disposed between the upper and lower pins 98 and 96, also passes through the spine 88 and the first and second panels 21 and 23. However, the third pin 35 is received in slots 37 in the first and second panels 21 and 23. With this, in an impact situation, the upper pin 98 could shear thereby allowing the spine to move a given amount as the third pin 35 travels within the slots 37. When the third pin 35 reaches an end of the slots 37, the third pin 35 will offer resistance to further movement of the spine 88. The third pin 35 could be designed to shear at a given force or designed to prevent any further movement of the spine 88. In light of the invention's provision of the slots 37 in the first and second panels 21 and 23, one will appreciate that it is well within the scope of the invention to provide slots (not shown) relative to the upper or lower pins 98 or 96 to allow the spine 88 to move freely a given amount as would be desirable with an adjustable seat or the like.

Figure 10:
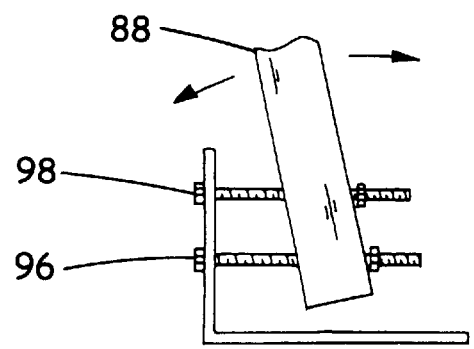
FIG. 10 is a view in side elevation of an alternative shear pin arrangement.

FIG. 10 shows still another manifestation of the shear pin concept. In this embodiment, the upper and lower pins 98 and 96 are oriented generally codirectionally with the expected axis of rotation of the spine 88 in response to an application of force from the rear of the seat back 100. In this case, the lower pin 96 again acts as the axis of rotation and is designed not to shear. However, the upper pin 98 is designed to shear under tension resulting from the forwardly applied force. To accomplish this, the upper pin could be crafted from any appropriate material, such as nylon, that will shear at a predetermined force.

Figure 7:
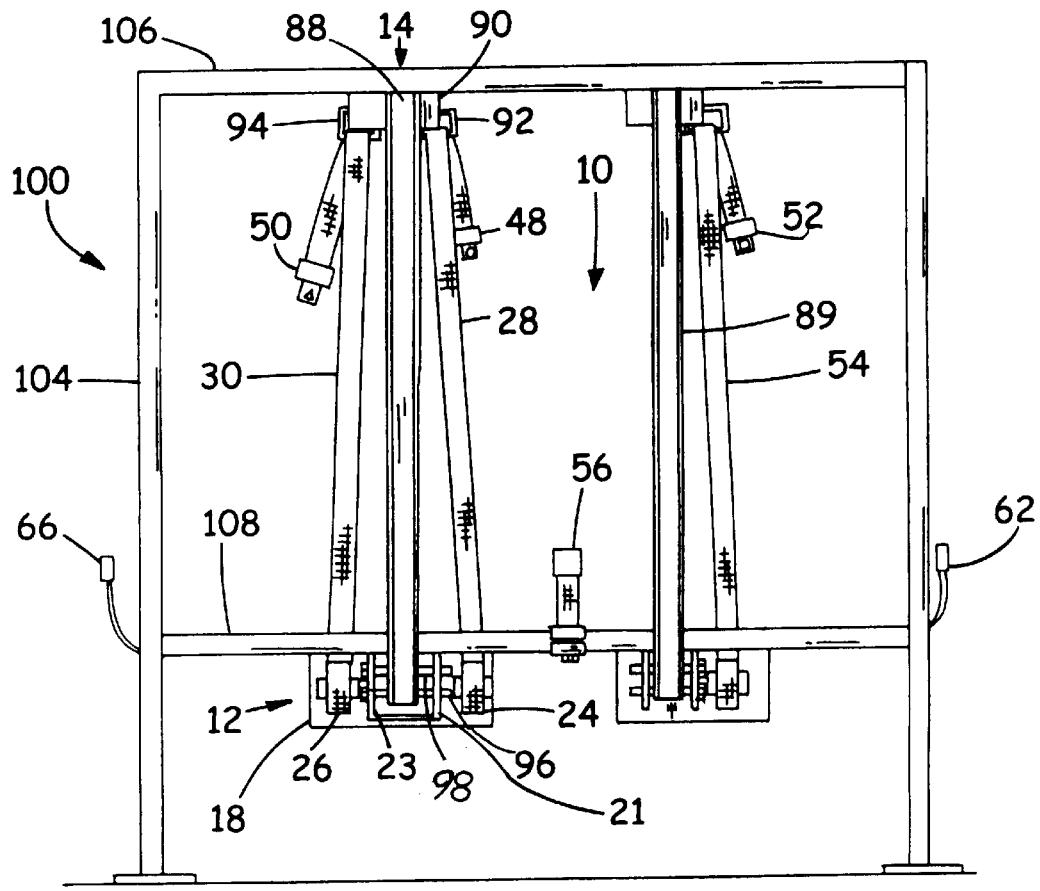
FIG. 7 a view in rear elevation of a further embodiment of the present invention for an occupant restraint system.

FIG. 7 shows yet another embodiment of the invention wherein a second spine 89, which is similarly equipped as spine 88, is provided for supporting a third elongate fabric strip 54, which retains a third male buckling element 52. A third female buckling element 62 is further provided for engaging the third male buckling element 52 to allow the occupant restraint system 10 to restrain three occupants. Of course, the first, second, and third elongate fabric strips 28, 30, and 54 of the occupant restraint system 10 of FIG. 7 could alternatively be arranged as shown in FIG. 1, or the occupant restraint system 10 of FIG. 7 could be supplemented by three lap belt arrangements as designed for restraining the third occupant in the embodiment of FIG. 1.

Figure 8:
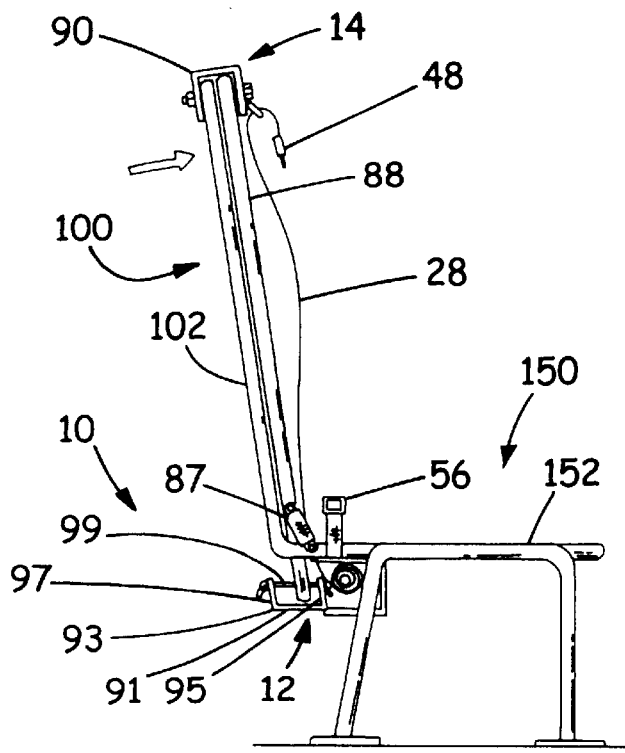
FIG. 8 is a view in side elevation of yet another embodiment of the present invention for an occupant restraint system.

FIG. 8 shows an embodiment of the invention that again incorporates the spine 88. Again, the upper end of the spine 88 is retained by the upper anchoring assembly 14, and the lower end of the spine 88 is retained by the lower anchoring assembly 12. However, instead of employing the upper and lower pins 98 and 96 for retaining the lower end of the spine 88 during normal operation but allowing the spine to give way under impact conditions, the embodiment of FIG. 8 employs a length of C-channel 93, which may be formed from a metal such as steel, for acting as a means for cupping the lower end of the spine 88. As such, a base 91 of the C-channel 93 provides support for the spine 88, a forward wall 95 of the C-channel 93 prevents the lower end of the spine 88 from sliding too far forward, and the rear wall 97 of the C-channel 93 prevents the lower end of the spine 88 from sliding too far rearward. Advantageously, the C-channel 93 allows the spine 88 to move forward with the seat back frame 100 ken sufficient force is applied thereto.

To prevent the spine 88 from lifting out of the C-channel 93, it would be advantageous to provide a means for preventing the first end of the spine 88 from lifting out of the C-channel 93. In one embodiment, a tether 99, which may comprise a reinforced steel cable or a rigid pin, has a first end fixed to the forward wall 95, a second end fixed to the rear wall 97, and a body portion that passes through an aperture in the spine 88. With this, the lower end of the spine 88 can slide along the base 91 of the C-channel, but the spine 88 cannot lift out of the C-channel. Alternatively or additionally, there may be provided a coupling strap 87, which may comprise a strip of flexible material such as durable fabric, with a first end fastened as by bolting to the spine 88 and a second end fastened as by bolting to the seat bottom 152.

Figure 9:
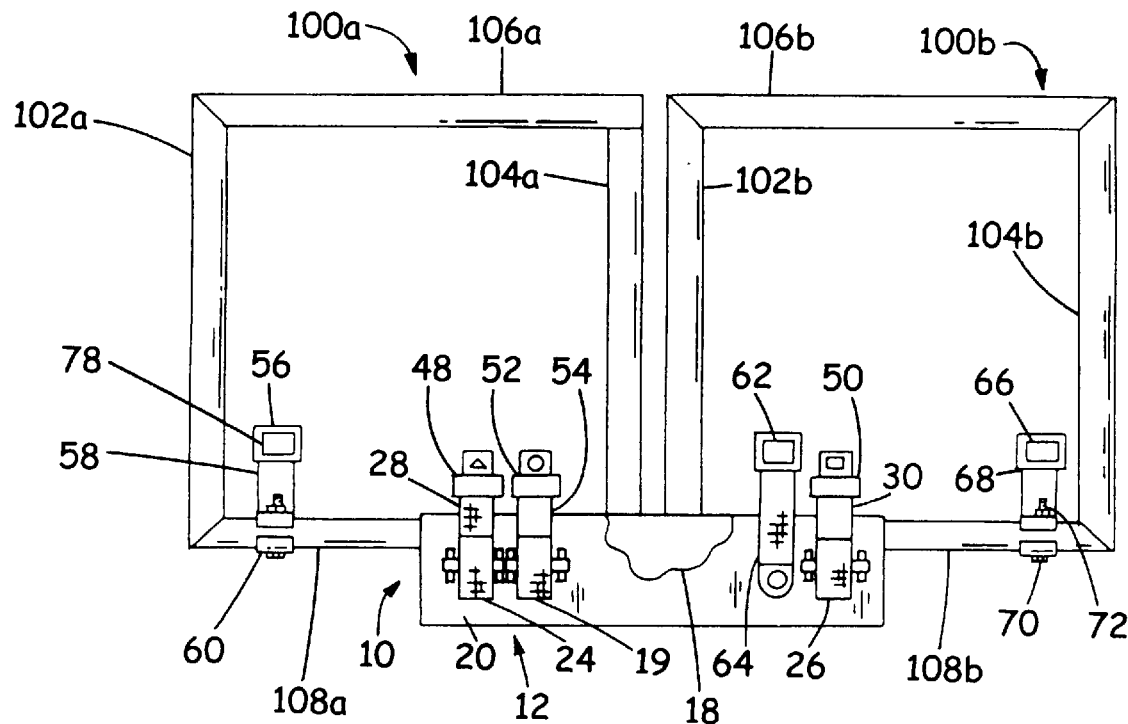
FIG. 9 is a view in front elevation of still another embodiment of the invention.

Yet another embodiment of the invention is shown in FIG. 9, where the occupant restraint system 10 is attached to a first seat frame 100*a* and a second seat frame 100*b* (as could each of the previously-described embodiments). In this embodiment, the occupant restraint system 10 can be readily attached to a vehicle seat or a multiplicity of vehicle seats to provide one or more two-point occupant restraint systems 10. In FIG. 9, three occupants can be restrained by the use of a first seat belt spool 24, a second seat belt spool 26, and a third seat belt spool 19. A first elongate fabric strap 28 with a first male buckle element 48 is spooled about the first seat belt spool 24, a second elongate fabric strap 30 with a second male buckle element 50 is spooled about the second seat belt spool 26, and a third elongate fabric strap 54 with a third male buckle element 52 is spooled about the third seat belt spool 19. The base plate 20 provides support and ready attachment for the first, second, and third spools 24, 26, and 19 and a sixth elongate flexible strap 64, which has a third female buckle element 62 disposed at the distal end thereof. First and second female buckle elements 56 and 66 are coupled to distal ends of the fourth elongate flexible strap 58 and the fifth elongate flexible strap 68, respectively, which are coupled to the lower members 108a and 108b, respectively. Of course, all of the occupant restraint system's 10 elements could be mounted on a single base plate 20, and those elements mounted to the base plate 20 could be shielded by the enveloping housing 18, which has been nearly completely sectioned away. With this, three occupants can be safely restrained on the first and second seat frames 100a and 100b.

In light of the foregoing, a number of advantages of the present invention relative to the prior art will be readily obvious both to one who has reviewed the present disclosure and to one who has an opportunity to make use of an embodiment of the present invention. It will also be clear that the present invention has been shown and described with reference to certain preferred embodiments that merely exemplify the broader invention revealed herein. Certainly, those skilled in the art can conceive of alternative embodiments. For instance, those with the major features of the invention in mind could craft embodiments that incorporate those major features while not incorporating all of the features included in the preferred embodiments.

With the foregoing in mind, the following claims are intended to define the scope of protection to be afforded the inventor, and the claims shall be deemed to include equivalent constructions insofar as they do not depart from the spirit and scope of the present invention. A plurality of the following claims express certain elements as a means for performing a specific function, at times without the recital of structure or material. As the law demands, these claims shall be construed to cover not only the corresponding structure and material expressly described in the specification but also equivalents thereof.

What is claimed is:

1. A combination of a bench-type school bus seat and a kit for retrofitting that school bus seat with an occupant restraint system, the combination comprising:
   a bench-type school bus seat comprising:
      a seat frame;
      a bench-type seat bottom fixed to the seat frame; and
      a bench-type seat back with an upper edge, a lower edge, and a seat back frame disposed inside a seat back cover wherein the seat back is fixed to the seat frame, wherein the entire seat back is constructed to pivot as a single unit about a single pivot axis for the seat back in response to the application of a given amount of force thereto, and wherein the seat back frame has a rigid upper member, a rigid lower member, a first upright member at a first end of the seat back frame, and a second upright member at a second end of the seat back frame;
   an occupant restraint system comprising:
      a rigid spine disposed between the first and second upright members of the seat back frame wherein the rigid spine has a first end fixed to the rigid lower member of the seat back frame and a second end fixed to the rigid upper member of the seat back frame;
      an upper anchoring assembly fixed relative to the second end of the rigid spine adjacent to the rigid upper member of the seat back frame;
      a lower anchoring assembly fixed relative to the first end of the rigid spine adjacent to the rigid lower member of the seat back frame;
      a first extendable and retractable elongate flexible member with a body portion, a point of coupling with the upper anchoring assembly, and a point of coupling with the lower anchoring assembly;
      a first buckle element coupled to the first elongate flexible member;
      a first corresponding buckle element coupled to the vehicle seat for buckling to the first buckle element;
      an axis bolt disposed adjacent to the lower edge of the seat back wherein the rigid spine is pivotable about the axis bolt such that the axis bolt acts as a pivot axis for the rigid spine wherein the pivot axis is substantially coincident with the single pivot axis for the entire seat back; and
      a first shear pin calibrated to shear in response to an application of a first given force on the seat back and the rigid spine wherein the first shear pin is operably disposed at a given distance spaced from the axis bolt to prevent the rigid spine and the seat back from pivoting until a force equal to or greater than the first given force is applied to the seat back and the spine whereupon the first shear pin shears to allow the spine and the entire seat back to pivot about the axis bolt.

2. The occupant restraint system of claim 1 further comprising an aperture in the rigid spine wherein the first shear pin passes through the aperture in the rigid spine.

3. The occupant restraint system of claim 2 wherein the aperture in the rigid spine is wider than the first shear pin whereby the spine can pivot over a given range without a shearing of the first shear pin and whereby the first shear pin will shear to allow the spine to pivot beyond the given range in response to the application of a force equal to or greater than the first given force on the seat back and the spine.

4. The occupant restraint system of claim 3 wherein the aperture in the rigid spine comprises a slot whereby the first shear pin can travel along the slot as the rigid spine pivots over the given range.

5. The occupant restraint system of claim 3 further comprising a second shear pin operably disposed relative to the rigid spine at a given distance from each of the axis bolt and the first shear pin wherein the second shear pin is calibrated to shear in response to the application of a second given force on the seat back and the spine wherein the second give force is less than the first given force whereby the second shear pin prevents pivoting of the seat back and the spine until a force equal to or greater than the second given force is applied to the seat back and the spine whereupon the second shear pin shears thereby allowing the spine to pivot about the axis bolt until restricted by the first shear pin and whereby the first shear pin prevents further pivoting of the seat back and the spin unless a force equal to or greater than the first given force is applied to the seat back and the spine.

* * * * *